United States Patent [19]

Ueno

[11] Patent Number: 4,575,537
[45] Date of Patent: Mar. 11, 1986

[54] FLUORORUBBER-BASED COMPOSITION

[75] Inventor: Keiji Ueno, Osaka, Japan

[73] Assignee: Sumitomo Electric Industries, Ltd., Japan

[21] Appl. No.: 657,427

[22] Filed: Oct. 3, 1984

Related U.S. Application Data

[63] Continuation-in-part of Ser. No. 346,328, Feb. 5, 1982, Pat. No. 4,489,113.

[30] Foreign Application Priority Data

May 2, 1981 [JP] Japan .................................. 56-16587
May 2, 1981 [JP] Japan .................................. 56-16588

[51] Int. Cl.$^4$ ......................... C08L 23/08; C08L 27/16
[52] U.S. Cl. .................................... 525/199; 428/36; 525/200
[58] Field of Search ......................................... 525/199

[56] References Cited

U.S. PATENT DOCUMENTS 4,094,949 6/1978 Yakokawa et al. ................. 264/234
4,197,380 4/1980 Chao et al. .......................... 525/199

FOREIGN PATENT DOCUMENTS 50-095351 7/1975 Japan ................................... 525/199

Primary Examiner—Carman J. Seccuro
Attorney, Agent, or Firm—Sughrue, Mion, Zinn, Macpeak, and Seas

[57] ABSTRACT

A fluororubber-based composition comprising a mixture of 100 parts by weight of fluororubber and 10 to 100 parts by weight of an ethylene-vinyl acetate copolymer having a vinyl acetate content of 10 to 30% by weight or an ethylene-ethyl acrylate copolymer having an ethyl acrylate content of 8 to 20% by weight. The product obtained from the composition has high heat resistance and oil resistance and is useful for production of heat-shrinkable products having excellent heat setting properties.

2 Claims, No Drawings

FLUORORUBBER-BASED COMPOSITION

This is a continuation-in-part of application Ser. No. 346,328, filed 2/5/82, now U.S. Pat. No. 4,489,113.

The present invention relates to a composition suitable for production of heat shrinkable products. More particularly, it is concerned with a composition comprising a mixture of fluororubber and a crystalline polymer, which is suitable for use for production of heat shrinkable products.

Heat shrinkable products such as tubes composed mainly of synthethic resins such as polyethylene, as ethylenevinyl acetate copolymer, polyvinyl chloride and chlorinated polyethylene have heretofore been known. It is also known as described in Japanese Patent Publication No. 39996/1976 that heat-shrinkable tubes are prepared from mixtures of amorphous rubber-like polymers and crystalline polymers.

There has been increasing desire for compositions suitable for producing heat-shrinkable products having higher heat resistance, oil resistance and which can be used at higher temperatures.

As a result of extensive investigations it has been found that heat-shrinkable products, for example, heat shrinkable tubes which can be used for example, reconnection of connectors of communication cables and electric cables or for the prevention of corrosion of steel pipes and which are capable of being used at temperatures higher than 150° C. can be prepared from those compositions containing fluororubber as a major ingredient.

The present invention is based on the above finding and provides a fluororubber-based composition comprising a mixture of (1) 100 parts by weight of fluororubber and (2) 10 to 100 parts by weight of an ethylene-vinyl acetate copolymer having a vinyl acetate content of 10 to 30 % by weight or an ethylene-ethyl acrylate copolymer having an ethyl acrylate content of 8 to 20 % by weight. The composition is suitable for use for production of heat shrinkable products which is obtained by expanding a product formed by using the composition and having an intended form after cross-linking the polymer in the composition.

Generally, materials having a memory effect (a property that the strain previously formed is removed by heating and the original from is recovered) which are useful for preparing heat-shrinkable products such as tubes can generally be prepared using those polymers containing crystals therein or by mixing crystalline polymers. Examples of such crystalline polymers include polyethylene, polypropylene, an ethylene-vinyl acetate copolymer (hereinafter referred to as "EVA"), an ethylene-ethyl acrylate copolymer (hereinafter referred to as "EEA"), polyvinylidene fluoride and polyamide.

Of the foregoing crystalline polymers, polyethylene and polypropylene have particularly high degrees of crystallization. Furthermore, polyethylene, polypropylene and the like have a solubility parameter (which is one of the criteria for the determination of compatibility and which is hereinafter referred to as "SP") of 7.8 to 8.0, which approaches the SP of 6.2 of fluororubber. It is therefore considered that such crystalline polymers as polyethylene and polypropylene would have good compatibility with the fluororubber and be suitable for mixing therewith to prepare fluororubber-based composition which could be used for the production of heat-shrinkable products.

In practice, however, it has been found that when such crystalline polymers are mixed with fluororubber by the use of heat rolls, they do not intermingle at all with each other and separate completely from each other, and molding thereof becomes impossible.

On the other hand, it has been found that when EVA having an SP value of 8.3 to 9.4 and EEA having an SP value of 8.5 to 9.4, which values are considerably higher than that of fluororubber, are used as a crystalline polymer and mixed by the use of heat rolls, the compatibility thereof with fluororubber is better as the vinyl acetate or ethyl acrylate content is higher, i.e., as the SP value is greater.

Furthermore, in view of heat setting properties of the products it has been experimentally confirmed that the vinyl acetate content of EVA and the ethyl atrylate content of EEA should be at least 10% by weight and at least 8% by weight, respectively. However, when they exceed 30% by weight and 20% by weight, respectively, the crystallizability of EVA and EEA is lost and these copolymers become rubber-like, and therefore, even if such EVA or EEA is mixed with fluororubber, the memory effect cannot be obtained.

Therefore, the vinyl acetate content of EVA and the ethyl acrylate content of EEA which can be used are from 10 to 30% by weight and from 8 to 20% be weight, respectively.

The amount of EVA or EEA to be added to fluororubber is approximately 10 to 100 parts by weight, more preferably 25 to 100 parts by weight, in view of heat setting properties of a product which is prepared from the resulting mixture.

In order to use a product, such as a sheet prepared from a mixture of fluororubber and EVA or EEA as a heat shrinkable product such as heat shrinkable tube, it is necessary to provide sufficient shrinkable properties thereto. For this purpose, it is essential to cross-link the polymers in the composition prior to expanding.

Such cross-linking can be performed by various techniques such as irradiation the product obtained from the composition with electron beams and cross-linking using organic peroxides or silicones.

After the cross-linking, the product is expanded to form a heat shrinkable product.

The thus-prepared heat-shrinkable product is superior particularly in heat resistance and oil resistance to those heat-shrinkable products prepared from the conventional compositions.

The following example is given to illustrate the invention in greater detail.

EXAMPLE

The polymers shown in Table 1 were each compounded to Fluororubber (sold under the trade name of Vitron B by E.I. Dupont) in the proportion of 1:1 (by weight) and kneaded by the use of heat rolls maintained at 140° C.

Each mixture was formed into a sheet having a thickness of about 1 mm with a heat press and then into a tubular form. It was then cross-linked by irradiation with 20 Mrad electron beam and then expanded to obtain a heat-shrinkable tube.

The above sheet was punched to obtain a dumbbell test piece. The test piece was subjected to 100% stretching in an oil bath maintained at 140° C. and then cooled with water. Dimensional changes and heat setting properties were examined, and the results are shown in Table 1.

TABLE 1

| Run No. | Polymer | Blending Properties | Heat Setting Properties[10] |
|---|---|---|---|
| 1 | polyethylene[1] | Very poor | molding impossible |
| 2 | polyolefine[2] | Poor | X |
| 3 | EVA[3] (VA: 5%) | Fair | O |
| 4 | EVA[4] (VA: 15%) | Good | O |
| 5 | EVA[5] (VA: 25%) | Excellent | O |
| 6 | EVA[6] (VA: 45%) | Excellent | X |
| 7 | EEA[7] (EA: 8%) | Good | O |
| 8 | EEA[8] (EA: 15%) | Good | O |
| 9 | EEA[9] (EA: 18%) | Good | O |

Note
VA: content of vinyl acetate monomer in the copolymer
EA: content of ethyl acrylate in the copolymer
[1]Polyethylene ... Sumikasen C215 (trade name), produced by Sumitomo Chemical Co., Ltd.
[2]Polyolefin ... Toughmer-A (trade name), produced by Mitsui Petro Chemical Co., Ltd.
[3]Ethylene-Vinyl Acetate Copolymer ... Evatate D2011 (trade name; vinyl acetate content; 5 wt %), produced by Sumitomo Chemical Co., Ltd.
[4]Ethylene-Vinyl Acetate Copolymer ... Evatate H1011 (trade name; vinyl acetate content; 15 wt %), produced by Sumitomo Chemical Co., Ltd.
[5]Ethylene-Vinyl Acetate Copolymer ... Evatate K2010 (trade name; vinyl acetate content; 25 wt %), produced by Sumitomo Chemical Co., Ltd.
[6]Ethylene-Vinyl Acetate Copolymer ... Evathrene 450P (trade name; vinyl acetate content; 45 wt %), produced by Dai-Nippon Ink & Chemicals, Inc.
[7]Ethylene-Ethyl Acrylate Copolymer ... DPDJ-8026 (trade name; ethyl acrylate content; 8 wt %), produced by Nippon Unicar Co., Ltd.
[8]Ethylene-Ethyl Acrylate Copolymer ... DPDJ-6182 (trade name; ethyl acrylate content; 15 wt %), produced by Nippon Unicar Co., Ltd.
[9]Ethylene-Ethyl Acrylate Copolymer ... DPDJ-6169 (trade name; ethyl acrylate content; 18 wt %), produced by Nippon Unicar Co., Ltd.
[10]The symbol O indicates that when the test piece is subjected to 100% stretching at 140° C. and cooled with water, the stretched form can be held as such at room temperature, whereas the symbol X indicates that the stretched form cannotbe held.

It can be seen from Table 1 that (1) although it is difficult to mix polyethylene and polypropylene with fluororubber, all the EVA and EEA resins can be mixed therewith, and (2) when an EVA or EEA resin having a high vinyl acetate or ethyl acrylate content is mixed with fluororubber, the resulting film has poor heat setting properties.

Heat setting properties were examined for various compositions in which the mixing ratio of fluororubber to EVA or EEA was changed. The results are shown in Table 2. In this test, Evatate H1011 and DPDJ-6169 were used as EVA and EEA, respectively. The heat setting properties were determined in the same manner as disclosed hereinabove.

TABLE 2

| Run No. | Crystalline Polymer | Weight Ratio of Fluororubber/ Crystalline Polymer | Value of Deformation Shrinkage (%) | Heat Setting Properties** | Hardness (Shore A) | |
|---|---|---|---|---|---|---|
| 1 | EVA H1011 (VA: 15%) (EVATATE H1011) | 100/0 (0)* | 18.0 | C | 74 | |
| 2 | EVA H1011 | 95/5 (5.3) | 13.5 | C | 74–75 | |
| 3 | EVA H1011 | 90/10 (11.1) | 6.5 | B | 75–76 | |
| 4 | EVA H1011 | 80/20 (25) | 2.4 | A | 75–77 | Present Invention |
| 5 | EVA H1011 | 50/50 (100) | 1.5 | A | 77–78 | |
| 6 | EVA H1011 | 20/80 (400) | 0.7 | A | 90–91 | |
| 7 | EVA H1011 | 0/100 (—) | 0 | A | 93 | |
| 8 | DPDJ-6169 (EA: 18%) | 100/0 (0) | 18.0 | C | 74 | |
| 9 | DPDJ-6169 | 95/5 (5.3) | 14.3 | C | 74–75 | |
| 10 | DPDJ-6169 | 90/10 (11.1) | 7.1 | B | 74–75 | |
| 11 | DPDJ-6169 | 80/20 (25) | 3.5 | A | 76–77 | Present Invention |
| 12 | DPDJ-6169 | 50/50 (100) | 2.0 | A | 78–79 | |
| 13 | DPDJ-6169 | 20/80 (400) | 0.8 | A | 87–89 | |
| 14 | DPDJ-6169 | 0/100 (—) | 0 | A | 89 | |

Note:
VA: content of vinyl acetate monomer in the copolymer
EA: content of ethyl acrylate monomer in the copolymer
*Values in parentheses are parts by weight of crystalline polymers per 100 parts by weight of fluororubber.
**Heat setting properties were determined by the extent of deformation: A: 5% or less, B: 10% or less; C: more than 10%.

The values A and B are acceptable values for the extent of deformation.

Table 2 above demonstrates the followings:

(1) That when the composition of a tube obtained by using a composition of the present invention contains a specific crystalline polymer in a specific amount, a composition having superior property (in deformation) to that of a composition not containing a definite amount of a crystalline polymer can be obtained; and (2) Values of hardness of compositions of the tube are substantially the same as that of the fluororubber.

While the invention has been described in detail and with reference to specific embodiments thereof, it will be apparent to one skilled in the art that various changes and modifications can be made therein without departing from the spirit and scope thereof.

What is claimed is:

1. A fluororubber-based composition useful for the production of heat-shrinkable products consisting essentially of a mixture of 100 parts by weight of fluororubber and 10 to 100 parts by weight of an ethylene-vinyl acetate copolymer having a vinyl acetate content of 10 to 30% by weight or an ethylene-ethyl acrylate copolymer having an ethyl acrylate content of 8 to 20% by weight.

2. A resin composition as in claim 1, wherein said composition consists essentially of a mixture of 100 parts by weight of fluororubber and 25 to 100 parts by weight of the ethylene-vinyl acetate copolymer or the ethylene-ethyl acrylate copolymer.

* * * * *